UNITED STATES PATENT OFFICE.

MARIE JOSEPHINE MAGARITY, OF WILMINGTON, DELAWARE.

VITRIFIED BRICK.

SPECIFICATION forming part of Letters Patent No. 679,427, dated July 30, 1901.

Application filed September 17, 1892. Serial No. 446,211. (No specimens.)

*To all whom it may concern:*

Be it known that I, MARIE JOSEPHINE MAGARITY, of Wilmington, in the county of Newcastle and State of Delaware, have invented certain new and useful Improvements in Vitrified Bricks and the Method of Making the Same, of which the following is a specification.

The present invention relates to the manufacture of vitrified brick, and particularly to vitrified brick designed for street-paving.

Vitrified brick as heretofore manufactured has qualities which render it imperfect for street-paving purposes. It is light and brittle, lacking in cohesiveness, so that a large proportion of the bricks are broken in the rough handling to which they are necessarily subjected in paving, and they are peculiarly liable after being laid to be chipped and broken by usage. Aside from these undesirable qualities vitrified bricks are most excellent for street-paving purposes, being but little affected by moisture and by extremes of heat and cold and being cheap and easily handled and laid.

Now the primary object of the present invention is to so manufacture vitrified brick that they shall be rendered tough and heavy while still retaining all the desirable qualities of ordinary vitrified brick in an enhanced degree, and, secondarily, to cheapen the cost of their manufacture by utilizing waste materials and using in their composition such materials as are readily obtained at or near the place of final use, in order that they may be manufactured near the place of final use, whereby the cost of transportation and handling may be reduced to a minimum.

In accomplishing the objects of the invention the principal thing consists in the selection and proportions of the proper materials, and this is largely dependent upon the raw materials which are available at any given locality. Many heretofore-utilized natural minerals and many waste products of manufacturing industries can be utilized by proper selection of them, having regard to their constituents and properties.

Generally speaking, it is essential in manufacturing vitrified brick in accordance with the present invention and which shall have the desired properties and qualities that there should be used a plastic material in order that the bricks may be properly molded and retain their shape during baking; a counter-shrinkage material in order to counteract the shrinkage of the plastic material during baking, and thereby retain the bricks in proper shape and size; a hardening material to give hardness to the finished brick; a dense heavy material to give weight and toughness to the finished bricks, and an igneous material or flux for vitrifaction. The several ingredients adopted for these qualities and properties should also be assimilable to each other. At the same time the mixture of ingredients employed must be such that they will not be fusible at the temperature necessary to bake the bricks, since otherwise a slag and not a brick would be produced. In selecting available materials having the desired properties it will be found that some materials contain more than one of the desired properties and that different materials contain one or more of the desired properties in varying proportions. These facts must be taken into consideration in making the bricks, and frequently it will be found practically necessary by reason of expense to disregard materials which give the best technical results and to use instead materials inferior from a technical standpoint.

In order that an understanding of the principles of the selection of materials for carrying out the present invention may be understood, a sample formula will be given. For the plastic material potters' plastic clay (kaolin) is used. The plastic property is due to the alumina present; but with an excess of alumina over the silica the bricks are apt to crack in burning. The presence of silica in proper proportions, however, remedies this by rendering the bricks more porous. These facts are well known in the art, and the proper selection of clay to secure the desired results is within the daily experience of brick-makers. The porosity of the bricks due to the presence of silica in the clay, it will be noted, makes the bricks light. In order that the shrinkage of the clay in baking may be counteracted, a silicious material, such as quartz-sand, is employed. The sand should preferably be in coarse grain in making paving-brick, so that the surface of the brick may be rough, and thereby afford a better foothold for horses. Where quartz-sand is used as the counter-shrinkage material the necessary hardness is also provided by the sand, so that no additional hardening material is necessary. A brick composed simply of clay and sand is, however, too light and brittle for paving purposes, and to increase its specific gravity and add to its toughness a proper weighting and toughening material is necessary. For this purpose a crystallized silicate of alumina with iron, preferably garnet, is employed. The garnet increases the density of the brick, and thereby its weight and toughness, and for the fluxing material an alkali, preferably mica-schist, is employed. The kaolin, quartz-sand, garnet, and mica-schist which are thus employed constitute ingredients which have chemical affinity for each other, and which are therefore assimilable, and they make a vitrified brick perfectly adapted for street-paving.

In order that the method of making the bricks may be clearly understood, I will describe the method of making the same with kaolin, quartz-sand, garnet, and mica-schist, naming such proportions as are suitable and such as will give excellent results, premising the description, however, with the statement that even the purest materials vary so greatly in their composition that correspondingly-varying proportions are necessary to give the best results and that the grade of the bricks produced will depend upon a thorough knowledge of the particular material used. The practical brick-maker will have no difficulty, however, in making the bricks with the directions here given. The ingredients already specified are taken in the following proportions: kaolin, fifty parts; quartz-sand, ten parts; garnet, ten parts; mica-schist, thirty parts; total, one hundred parts.

The clay should be mixed and treated by being spread on pans or in bins, dried at a temperature of about 400° Fahrenheit for from, say, twenty-four to forty-eight hours, and then reduced to lumps. The sand should be pure and in coarse grain. The garnet should be reduced to granular form. The mica-schist should be reduced to the fineness of flour in order that it may fuse and diffuse itself readily throughout the composition.

When the several ingredients are in proper degrees of fineness, they should be thoroughly mixed in any suitable clay-mill until the clay is also reduced to a fine grain and a homogeneous mixture is obtained. The mixture is then dumped into vats containing sufficient water to permit the tempering of the composition. The mass should be allowed to remain from, say, twenty-four to thirty-six hours, and is then transferred to a stamp-mill to be tempered constantly for about forty-eight hours. The mass is then allowed to stand for about twenty-four hours and is then tempered for about three hours. The composition is then shaped into bricks.

Four inches square by eight inches long is the shape which I consider best adapted for street-paving, since a proper depth is thereby attained and the number of joints is small. The bricks are then pressed and repressed and are then ready for the kilns.

In burning the bricks care should be exercised in not permitting the temperature to become too high, which would cause the bricks to be fire-cracked, and when the maximum temperature—say about 3,500° Fahrenheit—has been attained the reduction of the temperature should commence. From three to four days should be consumed in reaching the maximum and about as long in cooling. Atmospheric conditions affect the length of time employed. The completed bricks will be found to be thoroughly and uniformly vitrified throughout. The bricks are tough, dense, heavy, and sufficiently rough for paving purposes. The specific gravity of the finished brick will be approximately from 2.2 to 2.4. Practically, however, in making brick in different localities it will rarely be found possible to economically make vitrified brick for street-paving purposes from kaolin, quartz-sand, garnet, and mica-schist, and the materials used must be selected from available supplies. A very wide range of materials may be utilized. For the plastic material plastic clay, fire-clay, refuse fire-clay, impure kaolin, or waste kaolin (erroneously termed by the miners "mica") may, for example, be employed. For the sand any waste of quartz, flint, or flint-waste, sandstone, or sandstone-waste may, for example, be used.

For giving density and toughness to the bricks in place of garnet there may, for example, be employed waste of pyrolusite or waste of chlorite, refuse emery, or any refuse of crystallized alumina with iron, refuse corundum in mica, or refuse garnet and corundum in mica. For the flux instead of mica-schist there may, for example, be used damourite, the refuse of any micas, waste of calcite, slate, or slate refuse, refuse celestite, or any waste strontia, refuse gypsum, or any calcined waste of silica and alumina, or of silica, alumina, and iron, such as broken or waste china. Many materials can also be employed which unite in themselves several of the desired properties—for example, hardness, density, and fusion are furnished by refuse granite, gneiss, syenite or syenitic gneiss, hypersthene, hornblende or hornblende-schist, and diabase, all of which may be used. Decomposed felspar or the refuse of any of the felspars can be used for fusion and for hardness. In using any of these materials for any given purpose their proportions will depend upon the amount of other constituents that they replace—for example, a material which can be used both as a flux and for its weight may entirely or mostly obviate the use of any material for its weight alone. The constituents of each material will accordingly determine the proportion of it which should be used and the proportion of other materials which may be dispensed with. The proportion of clay used will also vary, depending upon the amount of alumina contained in the other ingredients. The same is true of the silicious material. The amount used will depend upon the silica present in all the other ingredients. The improved brick is hence characterized by its weight and density due to its contained weighting ingredient by the uniform vitrifaction due to the uniform distribution of the fluxing ingredient among the other ingredients and by the roughness of its exterior faces due to the coarse grain of the sand or equivalent hard material employed.

I claim as my invention—

1. A vitrified brick suitable for street-paving, composed of the following ingredients, to wit; a plastic cohesive material, such as kaolin or clay, constituting the base of the brick and its principal ingredient; a heavy material, such as garnet, hypersthene, or hornblende, giving density and wearing quality to the brick; a counter-shrinkage material, such as quartz-sand or any waste of silica; and an igneous or fluxing material, such as mica-schist, gneiss, granite, or syenite, which bonds together the other ingredients; all in the proportions substantially as set forth.

2. A vitrified brick suitable for street-paving, characterized by its weight and homogeneity, due to the incorporation in the process of manufacture with the plastic cohesive material, such as clay, constituting the base of the brick and its principal ingredient, of a material such as garnet having high specific gravity, and of a fluxing and bonding material, such as mica-schist, capable of assimilation with the other ingredients employed, substantially as set forth.

3. A vitrified brick suitable for street-paving, composed of a plastic cohesive material constituting the base of the brick and its principal ingredient, a hard dense material having a greater specific gravity than clay, and a counter-shrinkage material, all bonded together by a mineral flux and thoroughly commingled, substantially as set forth.

In witness whereof I have hereunto signed my name in the presence of two subscribing witnesses.

MARIE JOSEPHINE MAGARITY.

Witnesses:
ARTHUR S. BROWNE,
S. G. HOPKINS.